(12) United States Patent
Magagnin et al.

(10) Patent No.: US 11,848,423 B2
(45) Date of Patent: *Dec. 19, 2023

(54) SEMI-SOLID BATTERY WITH RECHARGING CAPABILITY

(71) Applicant: TERMO-IND SA, Chiasso (CH)

(72) Inventors: Luca Magagnin, Rho (IT); Vincenzo Tirella, Coldrerio (CH); Alessandra Accogli, Diso (IT); Gabriele Panzeri, Cornate d'Adda (IT); Eugenio Gibertini, Cusago (IT); Luca Succa, Rome (IT); Simone Brunetti, Rome (IT)

(73) Assignee: TERMO-IND S.A., Chiasso (CH)

( * ) Notice: Subject to any disclaimer, the term of this patent is extended or adjusted under 35 U.S.C. 154(b) by 223 days.

This patent is subject to a terminal disclaimer.

(21) Appl. No.: 16/968,006

(22) PCT Filed: Feb. 8, 2019

(86) PCT No.: PCT/EP2019/053184
§ 371 (c)(1),
(2) Date: Aug. 6, 2020

(87) PCT Pub. No.: WO2019/155012
PCT Pub. Date: Aug. 15, 2019

(65) Prior Publication Data
US 2021/0036382 A1 Feb. 4, 2021

(30) Foreign Application Priority Data
Feb. 9, 2018 (IT) .................. 102018000002547

(51) Int. Cl.
*H01M 10/36* (2010.01)
*H01M 4/134* (2010.01)
(Continued)

(52) U.S. Cl.
CPC ........... *H01M 10/36* (2013.01); *H01M 4/134* (2013.01); *H01M 4/48* (2013.01); *H01M 4/661* (2013.01);
(Continued)

(58) Field of Classification Search
None
See application file for complete search history.

(56) References Cited

U.S. PATENT DOCUMENTS

| 11,393,968 B2 * | 7/2022 | Magagnin | ............... H01L 35/22 |
| 2011/0017254 A1 * | 1/2011 | Stefan | ..................... H01L 35/08 |
| | | | 136/201 |

(Continued)

FOREIGN PATENT DOCUMENTS

| CN | 1091547 C | 9/2002 |
| EP | 0 924 721 A1 * | 6/1999 |
| WO | 2017140649 A1 | 8/2017 |

OTHER PUBLICATIONS

International Search Report and Written Opinion for corresponding Application No. PCT/EP2019/053184 (dated Apr. 30, 2019).

*Primary Examiner* — Laura Weiner
(74) *Attorney, Agent, or Firm* — Troutman Pepper Hamilton Sanders LLP

(57) ABSTRACT

The invention concerns a battery (1) comprising at least a first electrode (11) and a second electrode (12), placed at a suitable distance from each other, wherein said battery comprise an active material is between said electrodes (11, 12), said active material comprising: at least one oxygen-containing compound selected from the group consisting of MgO, ZnO, ZrOCl$_2$, ZrO$_2$, SiO$_2$, Bi$_2$O$_3$, Al$_2$O$_3$, Fe$_3$O$_4$, Fe$_2$O$_3$ and TiO$_2$; at least one salt selected from a chloride-containing salt and a sulphate-containing salt; at least one thickener additive selected from the group consisting of agar-agar, xanthan gum, methylcellulose, and gum arabic, (Continued)

and at least one plasticizer additive, wherein the particle size of the at least one oxygen-based compound has an average diameter in the range from 10 nm to 40 μm.

2 Claims, 4 Drawing Sheets

(51) Int. Cl.
*H01M 10/0564* (2010.01)
*H01M 10/05* (2010.01)
*H01M 4/66* (2006.01)
*H01M 4/48* (2010.01)

(52) U.S. Cl.
CPC ....... *H01M 10/05* (2013.01); *H01M 10/0564* (2013.01); *H01M 2300/0025* (2013.01); *H01M 2300/0085* (2013.01)

(56) References Cited

U.S. PATENT DOCUMENTS

| 2011/0100410 | A1* | 5/2011 | Takahashi | H01L 35/34 |
| | | | | 136/237 |
| 2017/0125658 | A1* | 5/2017 | Funahashi | H01L 35/34 |
| 2017/0346129 | A1 | 11/2017 | Stolyarov et al. | |
| 2018/0090655 | A1* | 3/2018 | Santamaria Razo | H01L 35/24 |
| 2019/0058101 | A1* | 2/2019 | Oi | H01L 35/34 |

* cited by examiner

SEMI-SOLID BATTERY WITH RECHARGING CAPABILITY

This application is a national stage application under 35 U.S.C. § 371 of PCT International Application Serial No. PCT/EP2019/053184, filed Feb. 8, 2019, which claims priority benefit of Italy Application No. 102018000002547, filed Feb. 9, 2018, which are hereby incorporated by reference in their entirety.

FIELD OF THE INVENTION

The present invention relates to a semi-solid battery with an increase in performance when exposed to heat/temperature.

STATE OF THE ART

Rechargeable batteries market is in continuous expansion especially because of their potential application in the automotive and storage field. Great efforts are dedicated to the improvement of the actual systems or to the discovery of new solutions.

A battery is also defined as an energy accumulator capable to provide electric current to a given load. Two different types of batteries exist: primary batteries, that cannot be charged, thus they are simply disposed of when the reactants are exhausted; and secondary batteries, capable to be charged and consequently discharged multiple times. In this view, the latter type has the ideal characteristics for applications such as automotive and storage ones.

The basic working principle of a battery consists in the oxidation (anode) and reduction (cathode) reaction occurring at the electrodes providing electrons to the external circuit. The nature of such reactions is based on two different types of phenomena: corrosion and intercalation. The former is related to the electrode oxidation with the consequent formation of a new compound, subsequently reduced to the initial state when the battery is recharged. The latter is based on intercalation, consisting in the reaction between small metal cations (e.g. $Li^+$) in a layered electrode material, typically carbon-based.

Temperature effect on these batteries is typically detrimental, usually associated to degradation of components such as separator membrane or related to a less efficient process, for example limiting charge voltage, related to the onset of gas evolution reaction.

It is the primary object of the present invention to provide a battery that shows a positive response to temperature. Within this object, a purpose of the present invention is to provide a battery easy to manufacture at competitive costs.

SUMMARY OF THE INVENTION

The present invention relates to a battery comprising at least a first electrode and a second electrode, placed at a suitable distance from each other and wherein an active material is present between said electrodes. According to the present invention, the active material comprises:
- at least one oxygen-containing compound selected from the group consisting of MgO, ZnO, $ZrOCl_2$, $ZrO_2$, $SiO_2$, $Bi_2O_3$, $Al_2O_3$, $Fe_3O_4$, $Fe_2O_3$ and $TiO_2$;
- at least one salt selected from a chloride-containing salt and a sulphate-containing salt;
- at least one thickener additive selected from the group consisting of agar-agar, xanthan gum, methylcellulose, and gum arabic, and;
- at least one plasticizer additive, wherein the particle size of the at least one oxygen-based compound has an average diameter in the range from 10 nm to 40 μm.

In the present invention when the term "plasticizer additive" is used, it is meant a substance capable to produce or promote plasticity when added to a composition; it may be, for example, silicone, siloxanes or carnauba wax, but naphthalene, PVDF, parylene, PTFE, FEP, PDMS, PVA and biopolymers can also be contemplated.

In the present invention when it is referred to the "particle size" of the at least one oxygen-based compound it is meant the average diameter of said particle as measured with Scanning Electron Microscope (SEM), Transmission Electron Microscope (TEM) or Dynamic Light Scattering (DLS).

In a preferred embodiment of the invention, the active material of the battery of the invention comprises MgO, ZnO and $ZrO_2$ as oxygen-containing compounds, at least one salt selected from a chloride-containing salt and a sulphate-containing salt, agar-agar, xanthan gum, methylcellulose as thickener additives and silicone as plasticizer additive.

In another aspect thereof, the invention concerns a process for preparing the active material comprised in the battery comprising the following steps:
a) preparing a solution of at least one oxygen-containing compound selected from the group consisting of MgO, ZnO, $ZrOCl_2$, $ZrO_2$, $SiO_2$, $Bi_2O_3$, $Al_2O_3$, $Fe_3O_4$, $Fe_2O_3$ and $TiO_2$ and of at least one salt selected from a chloride-containing salt and a sulphate-containing salt by adding a solvent selected from the group consisting of water, ethylene glycol, dimethyl carbonate, ethylene carbonate, diethyl carbonate, propylene carbonate, glycerin, dimethyl sulfoxide and their mixtures;
b) heating the solution of step a) at a temperature in the range from 75 to 90° C.;
c) adding at least one thickener additive selected from the group consisting of agar-agar, xanthan gum, methylcellulose and gum arabic, thus obtaining a homogeneous solution;
d) cooling down the homogenous solution of step c) to a temperature in the range from 30° C. to 15° C. allowing gelation, thus obtaining a gelled material;
e) adding at least one plasticizer to the gelled material of step d), thus obtaining the active material, wherein the particle size of the at least one oxygen-based compound has an average diameter in the range from 10 nm to 40 μm.

In still another aspect, the invention concerns an alternative process for preparing the active material of the battery of the invention comprising the following steps:
i) preparing a first solution with a solvent selected from the group consisting of water, ethylene glycol, dimethyl carbonate, ethylene carbonate, diethyl carbonate, propylene carbonate, glycerin, dimethyl sulfoxide and their mixtures of at least one oxygen-containing compound selected from the group consisting of MgO, ZnO, $ZrOCl_2$, $ZrO_2$, $SiO_2$, $Bi_2O_3$, $Al_2O_3$, $Fe_3O_4$, $Fe_2O_3$ and $TiO_2$ and of at least one salt selected from a chloride-containing salt and a sulphate-containing salt;
ii) heating the first solution of step i) at a temperature in the range from 90° C. to 110° C., thus obtaining a homogeneous solution;
iii) cooling down the homogenous solution of step ii) to a temperature in the range from 50° C. to 30° C.;
iv) preparing a second solution with a solvent selected from the group consisting of water, ethylene glycol, dimethyl carbonate, ethylene carbonate, diethyl carbonate, propylene carbonate, glycerin, dimethyl sulfoxide and their mixtures of at least one thickener additive selected from the group consisting of agar-agar, xanthan gum, methylcellulose, and gum arabic;

v) heating the second solution of step iv) at a temperature in the range from 90° C. to 120° C.;

vi) mixing the homogenous solution of step ii) at 45° C. with solution at step v) thus obtaining a further homogenous solution;

vii) cooling down the further homogenous solution of step vi) to a temperature in the range from 30° C. to 20° C. and subjecting it to cooling cycles from ambient temperature to −18° C.;

viii) adding at least one plasticizer additive to the solution of step vii), thus obtaining a homogenous material solution;

ix) optionally removing the solvent, obtaining the active material, wherein the particle size of the at least one oxygen-containing compound has an average diameter in the range from 10 nm to 40 μm.

The present invention also relates to a battery assembly comprising a plurality of batteries according to the invention.

DESCRIPTION OF FIGURES

Further features and advantages of the invention will be more apparent in light of the detailed description of the active material and of the preferred embodiments of the electric power generator with the aid of enclosed drawings in which.

DETAILED DESCRIPTION OF THE INVENTION

Figure 1:
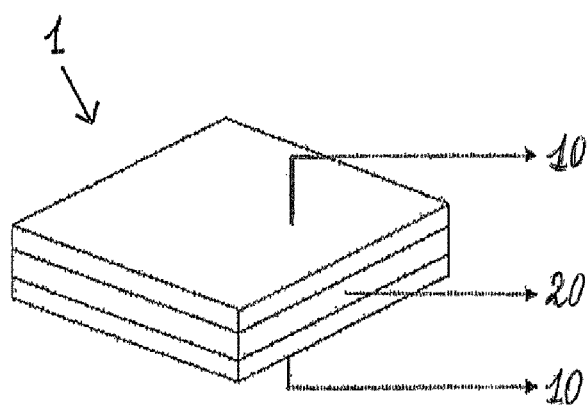
FIG. 1 shows the sandwich structure of battery according to the present invention.

The present invention hence relates to a battery comprising at least a first electrode (11) and a second electrode (12), placed at a suitable distance from each other and wherein an active material is between said electrodes (11, 12), and wherein said active material comprises:

at least one oxygen-containing compound selected from the group consisting of MgO, ZnO, $ZrOCl_2$, $ZrO_2$, $SiO_2$, $Bi_2O_3$, $Al_2O_3$, $Fe_3O_4$, $Fe_2O_3$ and $TiO_2$;

at least one salt selected from a chloride-containing salt and a sulphate-containing salt;

at least one thickener additive selected from the group consisting of agar-agar, xanthan gum, methylcellulose, and gum arabic, and;

at least one plasticizer additive, wherein the particle size of the at least one oxygen-based compound has an average diameter in the range from 10 nm to 40 μm.

The active material is capable to be applied on one electrode and to generate current when comprised between at least two electrodes without initial charging and dependently on the temperature.

The battery of the invention hence comprises at least a salt selected from a chloride-containing salt and a sulphate-containing salt, for example but not limited to NaCl, KCl, $ZrOCl_2$, $FeCl_3$, $FeCl_2$, $NiCl_2$, $CuCl_2$, $ZnCl_2$, $SnCl_2$, $CoCl_2$, $FeSO_4$, $NiSO_4$, $CuSO_4$, $ZnSO_4$, $SnSO_4$ and $CoSO_4$ and their hydrates.

The active material comprises a salt selected from a chloride-containing salt and a sulphate-containing salt, preferably in the weight percentage in the range from 0.05% and 20%, more preferably between 0.5% and 10%, still more preferably in the range from 1% to 5% with respect to the total weight of the active material.

As above, in the active material of battery of the invention the at least one oxygen-containing compound is selected from the group consisting of MgO, ZnO, $ZrOCl_2$, $ZrO_2$, $SiO_2$, $Bi_2O_3$, $Al_2O_3$, $Fe_3O_4$, $Fe_2O_3$ and $TiO_2$. Such a compound has a particle size corresponding to an average diameter in the range from 10 nm to 40 μm, preferably in the range of 15 nm-10 μm, more preferably 20 nm-5 μm. More preferably, the particles size of oxygen-containing compounds has an average diameter in the range from 10-200 nm, still more preferably in the range of 15-100 nm, still more preferably 20-40 nm.

According to an embodiment of the invention, the active material preferably comprises MgO as oxygen-containing compound, more preferably in the weight percentage in the range from 3% and 17%, preferably 10% with respect to the total weight of the active material.

Preferably, the active material comprises MgO together with both ZnO and $ZrO_2$ as oxygen-containing compounds, more preferably each one in the weight percentage in the range from 0.7% and 10%, still more preferably 3.7% with respect to the total weight of the active material.

The electrodes 11, 12 of the battery can be made of metallic materials or non-metallic materials as conventionally provided for the fabrication of a rechargeable battery. Preferably, the electrodes 11, 12 are made of a metallic material and more preferably made of a transition metal, preferably Ni, Cu, Zn, Fe, Pb and Co or their alloys. In alternative embodiments, the electrodes can be made of metals, alloys and/or carbon-based materials like graphite.

The thickness of the electrodes 11, 12 is in a range from 0.1 to 3000 μm, more preferably from 50 to 1000 μm, still more preferably from 300 to 600 μm. Preferably, the two electrodes 11, 12 have the same thickness.

According to further embodiments, at least one electrode is a conductive substrate suitable to have metals electroplated on its surface.

In a preferred embodiment, the two electrodes 11, 12 are made of Cu (in the following "Cu electrodes") and at least one of said Cu electrodes is covered with a layer of a transition metal preferably, but non exclusively, belonging to the group consisting of Fe, Zn and Co.

The transition metal layer can be plated on said at least one Cu electrode by any suitable techniques known in the art, preferably by electroplating process. Preferably, the transition metal layer has a thickness ranging from 0.1 μm to 1 mm, more preferably from 0.5 μm to 500 μm and still more preferably from 1 μm to 10 μm.

According to a further aspect, the at least two electrodes 11, 12 are preferably in form of substantially parallel plates or foils. In case of flexible battery, both self-standing flexible materials (among the previous listed materials) and metallized polymers can be considered as electrodes.

The active material comprises at least one thickener additive selected from the group consisting of agar-agar, xanthan gum, methylcellulose, and gum arabic. Preferably, the active material comprises agar-agar, xanthan gum, and/or methylcellulose as thickener additives, more preferably each one in the weight percentage in the range from 0.19% and 6.5%, still more preferably 0.84% with respect to the total weight of the active material.

The active material comprises also at least one plasticizer additive. The at least one plasticizer additive is preferably selected from the group consisting of silicone, siloxanes or carnauba wax, but naphthalene, PVDF, parylene, PTFE, FEP, PDMS, PVA and biopolymers can also be contemplated.

Without being bound to any theory, the inventors believe that the combined use of these materials, i.e. the at least one plasticizer with the oxygen-containing compounds of the invention, could enhance the performances of materials and hence of the battery containing it, thus improving the results obtained under particular regimes.

A gelled material is obtained after step d) of the process of the invention, as it will be clearer below.

The active material comprises also at least one plasticizer additive with respect to the weight of the gelled material in the range from 1:4 to 3:2, still more preferably in a ratio of 1:3.

More preferably the at least one plasticizer is silicone, still more preferably in an amount in the range from 5 to 40%, preferably 12.5% and 37.5%, still more preferably 33.3% by weight with respect to the total weight of the gelled material. The active material can comprise further compounds, preferably anthracene, lead zirconate titanate materials (PZT), and $Si_3N_4$.

The active material can be anhydrous or can contain a certain amount of the water deriving from the process for preparing it. In a preferred embodiment, the process provides for eliminating the excess water, thus guaranteeing that it still present, as absorbed coordinated water, in a percentage of at least 1% respect to the final active material's total mass.

The inventors deem that such a percentage of coordinated water in the final active material can ameliorate the performances of the battery obtained by incorporating the active material. The active material can also contain further additives. Additives may be water coordination additives, casein can be cited.

In a preferred embodiment of the invention, the active material of the battery together with a salt selected from a chloride-containing salt and a sulphate-containing salt comprises MgO, ZnO, $ZrO_2$ as oxygen-compounds, agar-agar, Xanthan gum, methylcellulose as thickener additives and silicone as plasticizer additive, wherein the particle size of the at least one oxygen-containing compound has an average diameter in the range from 10 nm to 40 μm.

In another aspect, the invention concerns a process for preparing the active material of the battery comprising the following steps:
  a) preparing a solution of at least one oxygen-containing compound selected from the group consisting of MgO, ZnO, $ZrOCl_2$, $ZrO_2$, $SiO_2$, $Bi_2O_3$, $Al_2O_3$, $Fe_3O_4$, $Fe_2O_3$ and $TiO_2$ and of at least one salt selected from a chloride-containing salt and a sulphate-containing salt, by adding a solvent selected from the group consisting of water, ethylene glycol, dimethyl carbonate, ethylene carbonate, diethyl carbonate, propylene carbonate, glycerin, dimethyl sulfoxide and mixtures thereof;
  b) heating the solution of step a) at a temperature in the range from 75° C. to 90° C.;
  c) adding at least one thickener additive selected from the group consisting of agar-agar, xanthan gum, methylcellulose, and gum arabic thus obtaining a homogeneous solution;
  d) cooling down the homogenous solution of step c) to a temperature in the range from 30° C. to 15° C., thus obtaining a gelled material;
  e) adding at least one plasticizer additive, selected from the group consisting of silicone, siloxanes or carnauba wax, to said gelled material of step d) thus obtaining the active material,
wherein the particle size of the at least one oxygen-based compound has an average diameter in the range from 10 nm to 40 μm.

Step a) of the process of the invention provides for preparing a solution of a solvent selected from the group consisting of water, ethylene glycol, dimethyl carbonate, ethylene carbonate, diethyl carbonate, propylene carbonate, glycerin, dimethyl sulfoxide and their mixtures, preferably water, of at least one oxygen-containing compound selected from the group consisting of MgO, ZnO, $ZrOCl_2$, $ZrO_2$, $SiO_2$, $Bi_2O_3$, $Al_2O_3$, $Fe_3O_4$, $Fe_2O_3$ and $TiO_2$ and of at least one salt selected from a chloride-containing salt and a sulphate-containing salt, preferably by stirring during the addition of the components.

More preferably, the addition of the components under stirring is carried out in sequence. Without being bound to any theory the inventors deem that in step a) the chloride salts and/or the sulphate salts increase the conductivity and/or to provide the ions necessary for the charging step.

In step b) the solution of step a) is heated at a temperature range from 75° C. to 90° C.

In step c) at least one thickener additive selected from the group consisting of agar-agar, xanthan gum, methylcellulose, and gum arabic is added. Further additives can be also added, for example casein. In the preferred embodiment of the invention step c) provides for the addition of agar-agar, xanthan gum and methylcellulose, advantageously in a simultaneous way. After the addition of the at least one thickener additive a homogenous solution is obtained preferably by stirring.

In step d) the homogenous solution of step c) is cooled down to a temperature in the range from 30° C. to 15° C., thus obtaining a gelled material.

In step e) the at least one plasticizer additive, for instance silicone, siloxanes or carnauba wax, is added, preferably under stirring, to the gelled material of step d).

In still another aspect, the invention concerns an alternative process for preparing the active material of the battery of the invention comprising the following steps:
  i) preparing a first solution of at least one oxygen-containing compound selected from the group consisting of MgO, ZnO, $ZrOCl_2$, $ZrO_2$, $SiO_2$, $Bi_2O_3$, $Al_2O_3$, $Fe_3O_4$, $Fe_2O_3$ and $TiO_2$ and of at least one salt selected from a chloride-containing salt and a sulphate-containing salt, by adding a solvent selected from the group consisting of water, ethylene glycol, dimethyl carbonate, ethylene carbonate, diethyl carbonate, propylene carbonate, glycerin, dimethyl sulfoxide and mixtures thereof;

ii) heating the first solution of step i) at a temperature in the range from 90° C. to 110° C., thus obtaining an homogeneous solution;

iii) cooling down the homogenous solution of step ii) to a temperature in the range from 50° C. to 30° C.;

iv) preparing a second solution with a solvent selected from the group consisting of water, ethylene glycol, dimethyl carbonate, ethylene carbonate, diethyl carbonate, propylene carbonate, glycerin, dimethyl sulfoxide and relative mixtures of at least one thickener additive selected from the group consisting of agar-agar, xanthan gum, methylcellulose, and gum arabic;

v) heating the second solution of step iv) at a temperature in the range from 90° C. to 120° C.;

vi) mixing the homogenous solution of step ii) at 45° C. with the solution of step v) thus obtaining a further homogenous solution;

vii) cooling down the further homogenous solution of step vi) to a temperature in the range from 30° C. to 20° C. and subjecting it to cooling cycles from ambient temperature to −18° C.;

viii) adding at least one plasticizer additive to the solution of step vii), thus obtaining a homogenous material solution;

ix) optionally, removing the solvent, and obtaining the active material, wherein the particle size of the at least one oxygen-containing compound has an average diameter in the range from 10 nm to 40 μm.

Preferably, mixing step vi) is carried out under a gas flow. Without being bound to any theory the inventors deem that fluxing different selected gaseous species during the mixing procedure could enhance the final performances of the as obtained battery, in terms of OCV, according to the series $N_2$>Air (wet)>Air (dry)>$O_2$ (dry)>$CO_2$ (dry).

Steps iv), v) and vi) can optionally be repeated before the mixing step (vii) by preparing a third or further solutions with the addition of a further thickener additive selected from the group consisting of agar-agar, xanthan gum, methylcellulose, and gum arabic.

Optional additives such as casein can be added in anyone of the solutions above cited in the process.

The process of the invention allows to obtain the active material having a viscosity in the range from 5,000 to 100,000 centipoise, preferably from 5,000 to 40,000 centipoise, more preferably from 10,000 to 20,000 centipoise, as measured with the rotatory viscometer Viscotester VTR5 at rpm=20 and T=25° C.

The active material can be placed on at least one electrode according to any suitable known application method in the art, for example doctor blade, electrophoresis, spin-coating, inkjet printing, sol-gel, thermal spray, sputtering, plasma and any physical or chemical vapour deposition techniques.

In a preferred embodiment of the battery schematically shown in FIG. 1, the at least two electrodes have a plate-shape. The two plates 10 are arranged substantially parallel to each other so as to define a gap filled with the active material 20 of the invention according to a "sandwich structure". The distance of the plates 10 depends directly on the desired thickness of the active material to be applied.

The shape of the electrodes is not binding. In an alternative embodiment, for example, the battery could comprise two coaxial cylindrical electrodes that define an annular space filled with the active material according to the invention. According to the invention, the battery could comprise more than two electrodes wherein two adjacent electrodes define a gap filled with the active material.

According to a preferred embodiment, the at least two electrodes are made of different materials, preferably of Cu and Zn plated-Cu. The at least two electrodes are preferably subjected to cleaning and etching prior to be used in the battery of the invention.

The active material is preferably applied on the electrode, by depositing the active material in a thickness from 100 nm to 5 mm. To now, the best results, using a load of 100 Ohm, have been observed with a thickness of 2 mm. On the other hand, the optimal thickness varies depending on the energy required from the device.

The active material can be deposited on the surface of the electrode with doctor blade technique or similar. Once the battery is assembled with the active material comprised between the at least two electrodes, the battery is preferably subjected to a heating step, more preferably at about 80° C., in order to obtain a solid sandwich structure.

Figure 1A:
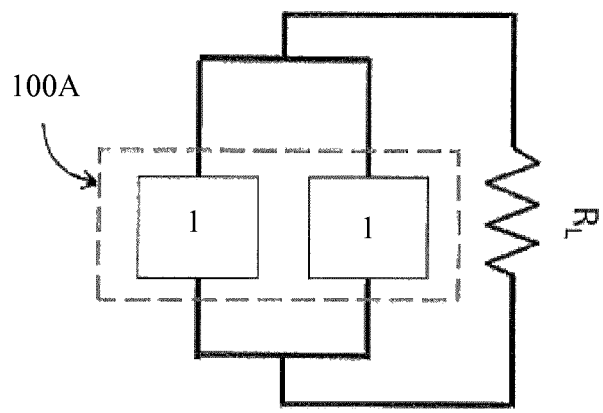
FIGS. 1A and 1B show a battery assembly comprising two batteries according to the invention connected respectively in parallel and in series.
Figure 1B:
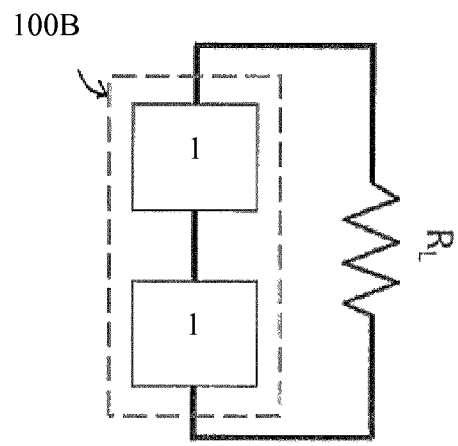

In another aspect, the present invention also relates to a battery assembly 100A, 100B comprising a plurality of batteries according to the invention. In a further aspect, the invention relates to a battery assembly 100A, 100B comprising a plurality of batteries according to the invention which can be connected in series or parallel. In this regard, FIG. 1A shows a circuit comprising a battery assembly 100A wherein the two batteries 1 are connected in parallel, while FIG. 1B shows a circuit comprising a battery assembly 100B with two batteries 1 connected in series. Both the circuits of FIGS. 1A and 1B comprise a load resistance $R_L$. The voltage relative to the battery assembly 100A, 100B can be monitored, for example, by connecting a galvanostat parallel to the load resistance $R_L$.

The invention will now be illustrated by some not limitative examples of the active material and of electric power generator of the invention.

EXAMPLES

Example 1

Preparation of the Active Material of the Invention

In order to prepare the active material the following components in the respective amounts reported in the below Table 1 were used. Particles size of oxygen-containing compounds (MgO, ZnO, $ZrO_2$) and of the chlorine-containing compound ($ZrOCl_2$) had an average diameter in the range from 10 nm to 40 μm, preferably in the range of 1-10 μm, more preferably 2-5 μm as sold by Sigma-Aldrich. The preparation was carried out by using all the above ranges of the particle average diameter and following the same procedure.

| Component | Function | Amount |
| --- | --- | --- |
| 1. Demineralized $H_2O$ | Solvent | 60-90% by weight with respect to the total weight of components 1-8 |
| 2. MgO | Oxygen-containing compound | 5-20% by weight with respect to the total weight of components 1-8 |
| 3. ZnO | Oxygen-containing compound | 1-7% by weight with respect to the total weight of components 1-8 |
| 4. $ZrO_2$ | Oxygen-containing compound | 0.1-5% by weight with respect to the total weight of components 1-8 |
| 5. $ZrOCl_2$ | Chloride-containing salt | 0.05-5% by weight with respect to the total weight of components 1-8 |
| 6. Agar-agar | Thickener additive | 0.1-3.5% by weight with respect to the total weight of components 1-8 |
| 7. Xanthan gum | Thickener additive | 0.1-2% by weight with respect to the total weight of components 1-8 |
| 8. Methyl- | Thickener additive | 0.1-2% by weight with respect to |

-continued

| Component | Function | Amount |
|---|---|---|
| cellulose | | the total weight of components 1-8 |
| 9. Silicone | Plasticizer additive | 20-60% by weight with respect to the total weight of the gelled material obtained after step d) |

In a becker demineralized water was poured and stirring was set between 200 and 400 rpm. The stirrer used was "AREX 630W", WELP SCIENTIFICA. In the becker, MgO, ZnO, $ZrO_2$ and $ZrOCl_2$ were added in sequence, by waiting 5 minutes after adding each component. A final homogeneous aqueous solution was obtained. The solution was then heated up to a temperature in the range from 80° C. to 90° C. Components agar-agar, xanthan gum and methylcellulose were added simultaneously and the stirring was manually continued until a homogeneous solution was obtained. The latter was then left to cool down to ambient temperature at T in the range from 15 to 30° C. under manual stirring. A gelled material was obtained. Silicone was then added, and the product was manually stirred until a homogenous active material was obtained.

Example 2

Assembling of a Battery Having Two Electrodes

Two square electrodes, respectively made of Cu and Zinc electroplated on Cu with a thickness of 4 μm and having the same area (about 25 $cm^2$), were cleaned and etched in order to be used for assembling the electric power generator. The active material obtained as described in Example 1 using oxides powders with average diameter of 2-5 μm was then deposited on the surface of Cu electrode with doctor blade technique. The thickness of the active material was about 2 mm and the electrode of Zn/Cu was placed on top of the deposited active material parallel to the Cu electrode. The two electrodes were gently pressed together assuring a uniform contact of the active material with their own surface. The product so obtained was baked for 20 minutes at 80° C. in order to dry the active material, thus obtaining a solid electric power generator. The generator of the invention so obtained was then stored at a temperature from 15° C. to 18° C. for a time period of 12-24 hours before testing it.

The baking process was performed to eliminate the excess water but to guarantee that it still present, as absorbed coordinated water, in a percentage of at least 1% respect to the active material's total mass.

Example 3

Electrical Characterization of the Battery of the Invention

The battery of Example 2 was electrically characterized by using an AMEL2553 potentiostat/galvanostat.

Figure 2:
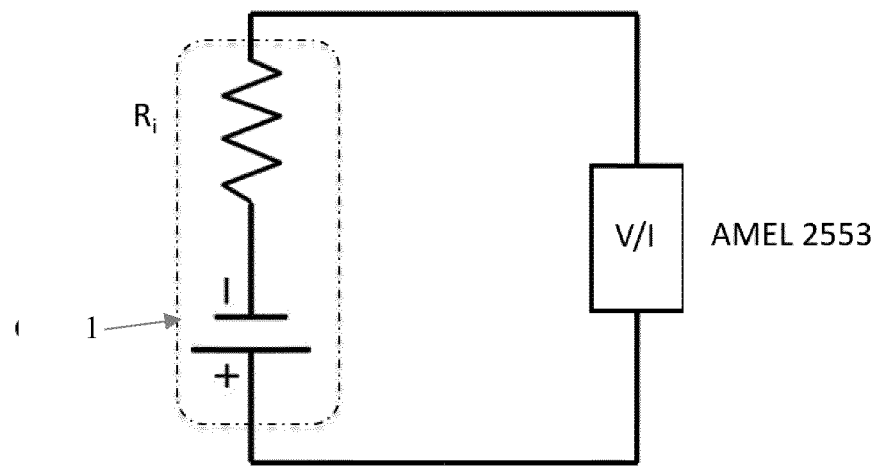
FIG. 2 shows an example of an electrical circuit comprising the battery according to the present invention.
Figure 3:
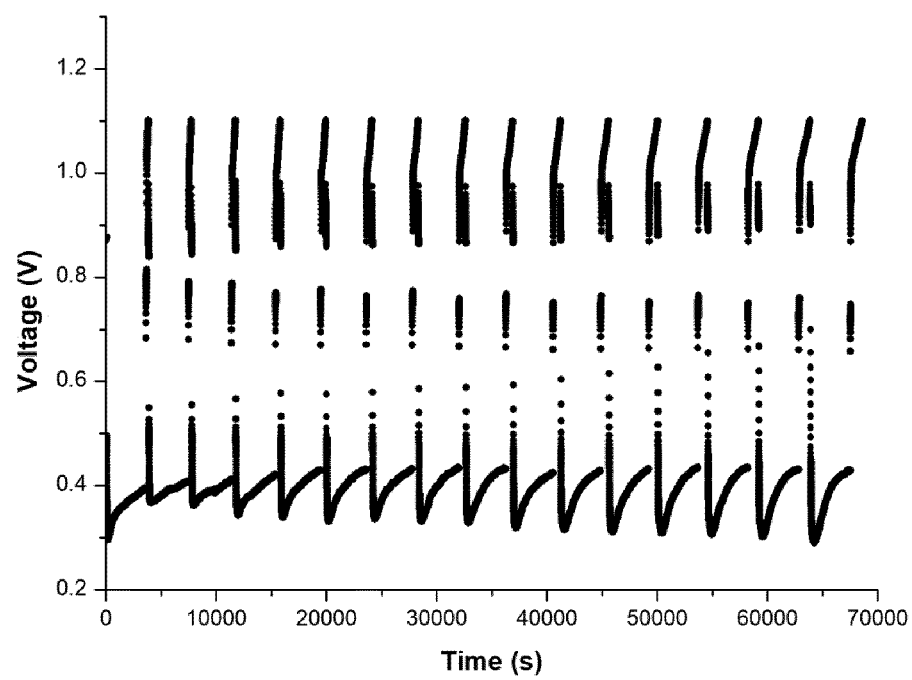
FIG. 3 shows the curve of the result of the tests carried out in example 3.
Figure 3A:
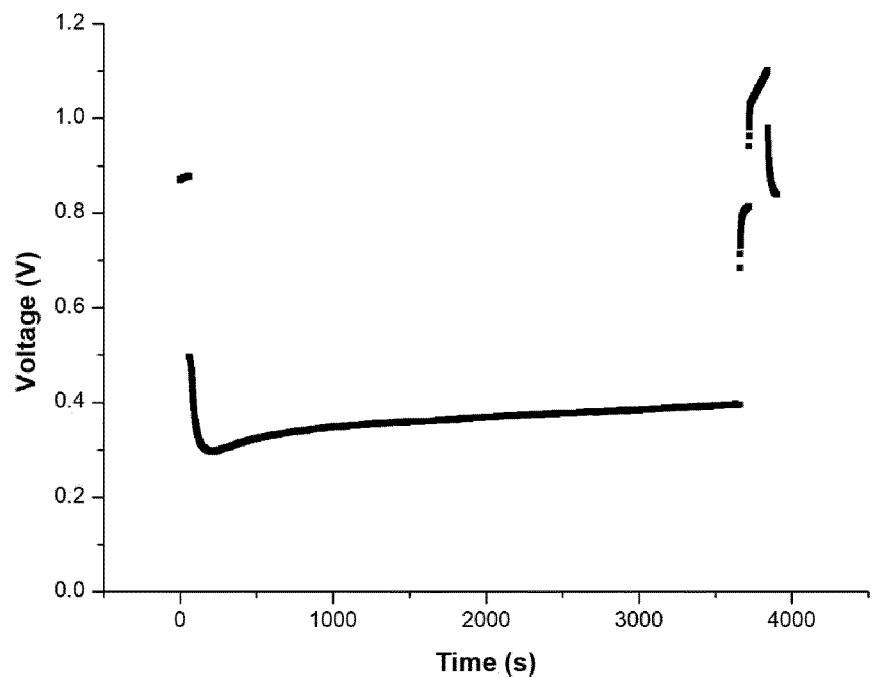
FIGS. 3A and 3B show the results of the tests carried out in example 3.
Figure 3B:
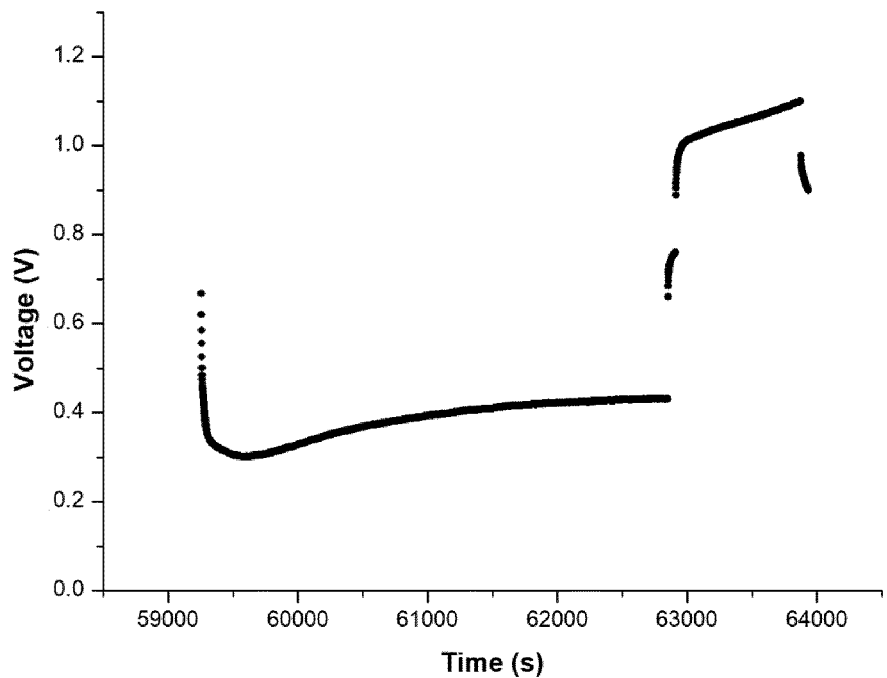

The electrical circuit is reported in FIG. 2. The AMEL2553 instrument has been used here both as load to discharge the battery and power source to recharge the battery. As usual for battery testing, the battery has been discharged at a constant current density, in this case 5 μA/$cm^2$, for 1 h and recharged at an equal current density for 1 h. Upper and lower voltage limits have been fixed respectively to 1.2 V and 0.3 V. The AMEL2553 instrument has been programmed to pass to the next step after one of this condition is fulfilled. Each of the cycles is followed by an open circuit measurement (OCV) of 60 s, to monitor the voltage recovery capability of the battery. The results are shown in FIG. 3. At the first cycle (see FIG. 3A), the Ohmic drop following the discharge is very high meaning a high resistance of the active material. In the following cycles, the Ohmic drop immediately after discharge is clearly reduced, meaning that the internal resistance of the active material has decreased as result of the sacrificial Zn dissolution to $Zn^{2+}$ ions that increase the conductivity. The same trend is clear from the recharge curves because the slope clearly decreases after the first cycle. This could be seen from the comparison between FIG. 3A, showing the first discharge-recharge cycle, and FIG. 3B which showing the last discharge-recharge cycle. Furthermore, the OCV difference after the consecutive recharge and discharge steps increases by cycling. It is likely that during the charging phase $Zn^{2+}$ are partially reduced at the metallic state at the Cu electrode. For instance, the ΔV after 60 s of open circuit measurement is 40 mV higher that the initial OCV value after the first charge/discharge cycle. The OCV value further increases by 100 mV at the $15^{th}$ cycle. These results confirm the product of the invention of example 2 behaves as a battery.

Example 4

Thermal Characterization of the Electric Power Generator

Figure 4:
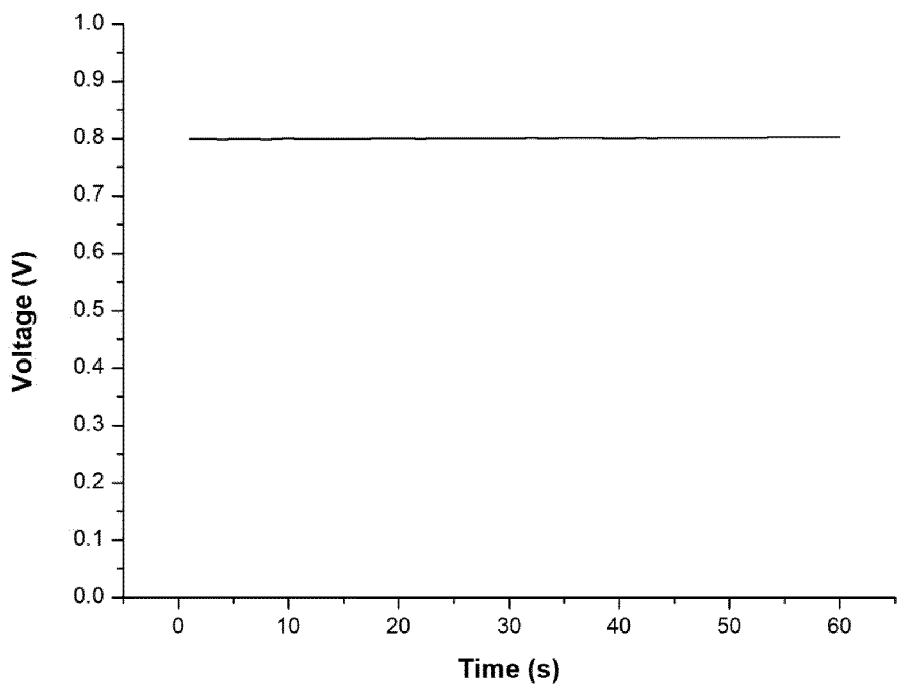
FIG. 4 shows the curve of the results of the test carried out in example 4.
Figure 5:
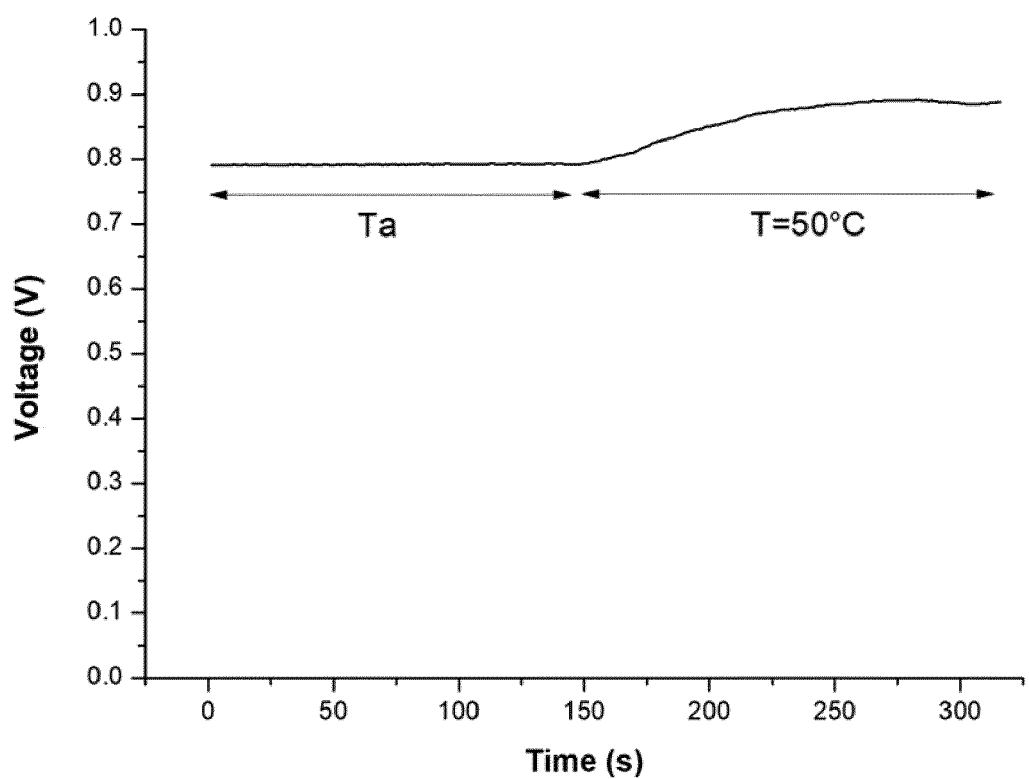
FIG. 5 shows the curve of the result of the tests carried out in example 4.

The circuit scheme reported in FIG. 2 comprising the battery of Example 2 was tested at ambient temperature (18-20° C.). The test consisted in a 60 s open circuit voltage measurement and the results are reported in FIG. 4. The OCV value is constant at 0.8 V. The same electric generator has been tested with OCV for 150 s at ambient T and suddenly heated at 50° C. for another 150 s with a heater-gun with controllable temperature. Unlike common battery, as shown in FIG. 5, the OCV increases of 100 mV to about 0.9 V. This behavior is not typical.

The invention claimed is:

1. A battery comprising:
    a first electrode and a second electrode disposed apart from each other, and an active material between and in contact with said electrodes, said first electrode made of Cu and said second electrode made of Cu covered with a layer of Zn, wherein the active material comprises:
        oxygen-containing compounds comprising MgO, ZnO, and $ZrO_2$, and a particle size of each of the oxygen-containing compounds has an average diameter in the range from 10 nm to 40 μm;
        a chloride-containing salt comprising $ZrOCl_2$;
        a solvent selected from the group consisting of water, ethylene glycol, dimethyl carbonate, ethylene carbonate, diethyl carbonate, propylene carbonate, glycerin, dimethyl sulfoxide and mixtures thereof;
        thickener additives comprising agar-agar, xanthan gum, and methylcellulose, and
        a plasticizer additive comprising silicone.
2. A battery assembly comprising a plurality of batteries according to claim 1.

* * * * *